United States Patent
Narayan et al.

(10) Patent No.: US 12,106,328 B2
(45) Date of Patent: *Oct. 1, 2024

(54) METHOD FOR IN-STREAM AGGREGATION OF AD INTERACTION DATA FOR A POPULATION OF USERS VIEWING AD CONTENT

(71) Applicant: Yieldmo, Inc., Nashua, NH (US)

(72) Inventors: Indu Narayan, Nashua, NH (US); Jayashankar Kesavankutty Nair, Nashua, NH (US)

(73) Assignee: Yieldmo, Inc., Nashua, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/227,035

(22) Filed: Jul. 27, 2023

(65) Prior Publication Data
US 2023/0368246 A1    Nov. 16, 2023

Related U.S. Application Data

(63) Continuation of application No. 17/198,181, filed on Mar. 10, 2021, now Pat. No. 11,756,079, which is a (Continued)

(51) Int. Cl.
G06Q 30/0251    (2023.01)
G06F 16/27    (2019.01)

(52) U.S. Cl.
CPC ......... *G06Q 30/0267* (2013.01); *G06F 16/27* (2019.01)

(58) Field of Classification Search
CPC ........................... G06Q 30/0267; G06F 16/27
See application file for complete search history.

(56) References Cited

U.S. PATENT DOCUMENTS

2011/0082755 A1* 4/2011 Itzhak ............... G06Q 30/0277
                                                                  705/14.69
2015/0310484 A1* 10/2015 Haile ................ G06Q 30/0246
                                                                  705/14.45
(Continued)

OTHER PUBLICATIONS

Supporting Web Analytics by Aggregating User Interaction Data From Heterogeneous Devices Using Viewport-DOM-Based Heat Maps; Fabrizio Lamberti et al. IEEE 2017.*
(Continued)

*Primary Examiner* — Arthur Duran
(74) *Attorney, Agent, or Firm* — Run8 Patent Group, LLC; Peter Miller; Leah Raddatz

(57) ABSTRACT

One variation of a method for aggregating advertisement interaction data includes: receiving a ping from a visual element loaded onto a mobile device, the ping containing: a timestamp; and a value representing a proportion of the visual element visible in a viewport at the mobile device; in response to the value exceeding a threshold value, grouping the ping with a group of pings in a ping feed, the group of pings containing a unique identifier associated with the mobile device; in response to the value falling below the threshold value, concluding an advertisement view session containing the group of pings; calculating a time spent value for visibility of advertisement content in the visual element within the advertisement view session based on timestamps of pings in the group of pings; outputting an advertisement view session packet containing the unique identifier and the time spent value to a database.

20 Claims, 5 Drawing Sheets

Related U.S. Application Data continuation of application No. 16/504,201, filed on Jul. 5, 2019, now Pat. No. 10,977,690.

(60) Provisional application No. 62/694,419, filed on Jul. 5, 2018.

(56) References Cited

U.S. PATENT DOCUMENTS

2016/0328738 A1* 11/2016 Liu .................... G06Q 30/0242
2017/0316092 A1* 11/2017 Fichter ................. G06F 16/958

OTHER PUBLICATIONS

VDHM: Viewport-DOM based Heat Maps as a Tool for Visually Aggregating Web Users' Interaction Data from Mobile and Heterogenous Devices; Fabrizio Lamberti et al. IEEE 2015.*

* cited by examiner

METHOD FOR IN-STREAM AGGREGATION OF AD INTERACTION DATA FOR A POPULATION OF USERS VIEWING AD CONTENT

CROSS-REFERENCE TO RELATED APPLICATIONS

This Application is a continuation of U.S. patent application Ser. No. 17/198,181, filed on 10 Mar. 2021, which is a continuation of U.S. patent application Ser. No. 16/504,201, filed on 5 Jul. 2019, which claims the benefit of U.S. Provisional Application No. 62/694,419, filed on 5 Jul. 2018, and is related to U.S. patent application Ser. No. 16/427,303, filed on 30 May 2019, each of which is incorporated in its entirety by this reference.

TECHNICAL FIELD

This invention relates generally to the field of mobile advertising and more specifically to a new and useful method for in-stream aggregation of advertisement interaction data for a population of users viewing advertisement content in the field of mobile advertising.

BRIEF DESCRIPTION OF THE FIGURES

FIG. one is a flowchart representation of a method;
FIG. two is a flowchart representation of one variation of the method.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
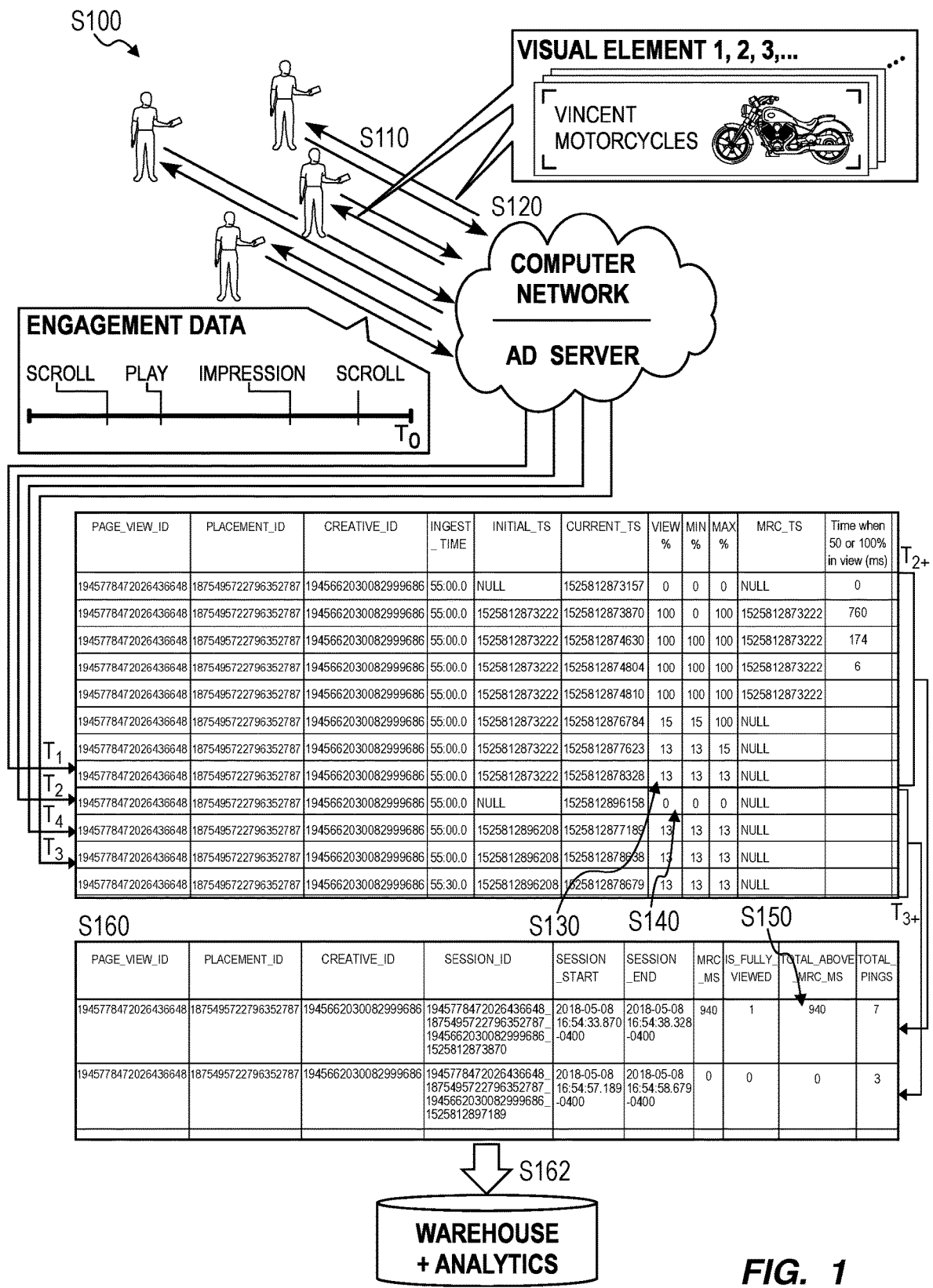

As shown in FIG. 1, a method S100 for aggregating advertisement interaction data for a population of users viewing advertisement content includes: serving a set of visual elements loaded with advertisement content to a population of mobile devices for insertion into webpages viewed on the population of mobile devices in Block S110, each visual element in the set of visual elements configured to output a sequence of pings on an interval, each ping containing a unique identifier of a corresponding visual element, a timestamp, and an in-view value representing a proportion of the corresponding visual element visible in a viewport on a corresponding mobile device in the population of mobile devices; via a computer network, receiving a first ping from a particular visual element, in the set of visual elements, loaded onto a particular mobile device in the population of mobile devices in Block S120, the first ping containing: a first timestamp; and a first in-view value representing a first proportion of the particular visual element visible in a particular viewport at the particular mobile device at a first time corresponding to the first timestamp; in response to the first in-view value exceeding a threshold in-view value, grouping the first ping with a first group of pings in a ping feed in Block S130, the first group of pings containing a first unique identifier associated with the particular mobile device and received prior to the first ping; in response to the first in-view value falling below the threshold in-view value, concluding a first advertisement view session containing the first group of pings in Block S140; and, in response to concluding the first advertisement view session: calculating a first time spent value for visibility of advertisement content in the particular visual element within the first advertisement view session based on timestamps of pings in the first group of pings in Block S150; generating a first advertisement view session packet containing the first unique identifier, containing the first time spent value, and representing the first group of pings in Block S160; and outputting the first advertisement view session packet to a database in Block S162.

One variation of the method S100 includes: serving a set of visual elements loaded within advertisement content to a population of mobile devices for insertion into webpages viewed on the population of mobile devices in Block S110, each visual element in the set of visual elements configured to output a sequence of pings on a regular interval, each ping containing a unique identifier of a corresponding visual element, a timestamp, and a value representing a proportion of the corresponding visual element visible in a viewport on a corresponding mobile device; receiving a first ping from a particular visual element, in the set of visual elements, loaded onto a particular mobile device via a computer network in Block S120; in response to the first ping containing a first value representing more than a threshold proportion of the particular visual element visible in a viewport at the particular mobile device, inserting the first ping containing a first unique identifier into a first group of pings—containing the first unique identifier and received prior to the first ping—in a ping feed sorted by timestamps contained in pings in the first group of pings in Block S130; in response to the first ping containing a first value representing less than the threshold proportion of the particular visual element visible in the viewport at the particular mobile device, concluding a first advertisement view session containing the first group of pings in Block S140; in response to concluding the first advertisement view session, calculating a first time spent value for visibility of advertisement content in the particular visual element during the first advertisement view session based on timestamps of pings in the first group of pings, weighted by values contained in pings in the first contiguous subset of pings in Block S150; generating a first advertisement view session packet containing the first unique identifier, containing the first time spent value, and representing the first group of pings in Block S160; and outputting the first advertisement view session packet to a database in Block S162.

2. Application

Generally, the method S100 can be executed by a remote computer system: to serve self-contained visual elements— loaded with responsive advertisement content and configured to stream basic interaction data back to the remote computer system on regular intervals—to a population of mobile devices over time; to aggregate basic advertisement interaction data inbound from these visual elements in real-time as these visual elements are viewed within the webpages accessed on these mobile devices; and to aggregate and output these basic advertisement interaction data into interaction metrics with significantly smaller memory footprints in (near) real-time. More specifically, the remote computer system can receive pings from a visual element loaded on a webpage accessed at a specific computing device associated with a user; transform the user interaction data contained in the pings recorded by the visual element into simpler interaction metrics (e.g., a quantity of vertical scrolls over the visual element; a quantity of clicks on the visual element; a quantity of horizontal swipes over the visual element; a quantity of tilt events at the computing device; etc.); define one or more advertisement view sessions based on interaction data (e.g., visibility, scroll, MRC, etc.) recorded by the visual element while loaded on the webpage at the specific computing device; output the compressed data (e.g., interaction metrics, timestamp) of the advertisement view sessions to a database; and selectively serve advertisement content to the user based on the engagement data collected for this user in the future and in near real-time.

For example, an advertisement server can select a visual element containing particular advertisement content and serve this visual element to a mobile device for insertion into a webpage accessed within a web browser executing on this mobile device. The visual element can: track its location within a viewport on the mobile device and other interactions while the webpage is open; respond to these interaction locations (e.g., by starting or stopping video advertisement content playback, seeking through a series of images or frames, indexing through a set of virtual cards); and output "pings" containing identifying information for the visual element and mobile device, a timestamp, a position of the visual element relative to the viewport, and/or an orientation of the mobile device in real space, etc. on a regular interval, such as once per 200 milliseconds (or 5 Hz). A remote computer system (e.g., a distributed computer network) can execute Blocks of the method S100 to: receive these pings in series; group these pings by identifying information contained in these pings; sort these pings by timestamp; delineate clusters of pings representing discrete periods in which the visual element is visible in the viewport based on visual element location data stored in pings; discard pings representing instances in which the visual element is not visible in the viewport; extract interaction metrics from each cluster of pings; aggregate each clusters of pings into one advertisement view session packet containing identifying time and interaction data for the corresponding period in which the visual element was visible in the viewport; and output these advertisement view session packets in (near) real-time. For example, an ad server or a content distribution network can access a stream of advertisement view session packets—representing a current or recent advertisement session at a mobile device—thus generated by the remote computer system according to Blocks of the method in order to gauge user interest in this advertising content or appropriateness of this advertising content to the user and to then elect a next digital advertisement for the user, such as during the same or later browser session at the user's mobile device.

The remote computer system can therefore execute Blocks of the method S100 to aggregate advertisement interaction data—received at a high frequency (e.g., 5 Hz) from many visual elements loaded onto many mobile devices over time—in-stream and to significantly reduce a record size for these advertisement interaction data without compromising insights contained in these advertisement interaction data. For example, by compiling these advertisement interaction data in the stream (or "in the pipe") before these advertisement interaction data are written to a more permanent database, the remote computer system can avoid storage of a high volume of raw data and reduce memory allocation (e.g., by ~95%) and limit end-to-end latency (e.g., to less than 1.5 seconds after a visual element interaction at a mobile device) while preparing these data for more efficient warehousing and analytics. For example, the remote computer system can therefore execute the method S100 to aggregate pings received from visual elements and to extract insights from these pings to enable both (near) real-time optimization of a creative's mobile advertising budget and (near) real-time retargeting of advertisement content to the user, such as while the user navigates through the same website or even while the user navigates within the same webpage.

2.1 Minimal Local Processing

Generally, the remote computer system can execute Blocks of the method S100 to derive deep and varied (e.g., ad campaign-specific, advertisement-specific) insights into user engagement with an advertisement served to a mobile device despite few or no calculations performed within this advertisement at the mobile device. More specifically, the remote computer system can execute Blocks of the method S100 to derive engagement metrics—characterizing interactions between a user and the advertisement at the mobile device—based on a stream of raw, baseline pings output by a visual element containing the advertisement and without relying on a local processing stack at the mobile device to queue and execute such engagement metric calculations.

In particular, the visual element can be configured to broadcast raw pings containing minimal basic information (e.g., timestamps, visual element location relative to a viewport, and (x,y) locations of touch events over the visual element) from a time the visual element is loaded onto a webpage until the webpage is closed or navigated away from at a mobile device. For example, the remote computer system can: group pings from the visual element into advertisement sessions; derive engagement metrics in each advertisement session (e.g., a duration of time that at least a portion of the visual element was in view, a proportion of the visual element that was in view, a number of scroll events, a number of swipe events, and/or a number of click events at the mobile device during this advertisement session); aggregate multiple advertisement sessions for this instance of the visual element at the mobile device into one browse session; derive engagement metrics for the browse session, such as by aggregating engagement metrics for advertisement sessions contained in this browse session according to existing engagement metric definitions for advertisement content in this visual advertisement. Therefore, even if the visual element fails to transmit a last queued ping before the webpage is closed, the remote computer system can still access ping data that is complete and accurate within 200-milliseconds of closure of the visual element and derive comprehensive engagement metrics for this browse session according to these ping data.

2.2 High-Resolution Data

Furthermore, the remote computer system can execute Blocks of the method S100 to derive high-resolution engagement metrics for the advertisement from basic, raw information contained in pings received from the visual element. For example, the visual element can be configured to: generate a ping including pixel-level coordinates of touch inputs occurring over the visual element and pixel-row-level resolution of a portion of the advertisement visible in a viewport at the mobile device during a 200-millisecond ping interval; output this ping to the remote computer system in (near) real-time; and repeat this process at a frequency of 5 Hz (i.e., with a temporal resolution of 200 milliseconds) during a browse session in which the visual element is loaded into a document (e.g., a webpage) open at a mobile device. The remote computer system can then derive high-resolution engagement metrics from this sequence of high-resolution pings, such as: a maximum proportion of the advertisement visible to a user at the mobile device at any time; a duration of time that a minimum proportion of the advertisement was visible to the user; locations of user touch inputs over the advertisement; durations of user touch inputs over the advertisement; pathways of continuous user touch inputs over the advertisement; duration, quantity, and frequency of scroll events; duration, quantity, and frequency of swipe events over the advertisement; etc. during the browse session.

Additionally, because the visual element generates and outputs timestamped pings at a high frequency, even if pings do not arrive at the remote computer system in order of creation—such as due to network bandwidth changes or data rerouting through the network—the remote computer system can sort and order these pings upon receipt. Furthermore, if some (e.g., typically fewer than 1%) of these pings are lost during transmission to the remote computer system, the remote computer system can still group and sort accessible pings by timestamp, interpolate across missing pings based on data contained in accessible pings, and derive engagement metrics with similarly-high-resolution and accuracy.

The remote computer system can also leverage these advertisement view session packets containing high-resolution engagement metrics to construct an engagement model for advertisement interactions at this particular mobile device, to construct a model for advertisement interactions more generally, and/or to select a next advertisement for the particular mobile device that is more engaging for a user. For example, the remote computer system can: serve a set of visual elements—containing a digital advertisement—to a population of mobile devices for insertion into webpages viewed on these mobile devices over a first period of time; aggregate pings generated by these visual elements into a ping feed; group these pings by mobile device and browse session; derive engagement metrics for each user interacting with an instance of this visual element containing a digital advertisement based on corresponding groups of pings in the ping feed and predefined engagement metric definitions for this digital advertisement; derive correlations between these engagement metrics and target outcomes (e.g., click-through, viewability, time spent, brand lift) specified by an advertising campaign hosting this digital advertisement; and store these correlations in a model for predicting user interactions with advertisement content viewed by users at this population of mobile devices. At a later time, the remote computer system can: serve the digital advertisement to a second population of mobile devices; aggregate pings generated by these visual elements into a ping feed; group these pings by mobile device and browse session; derive engagement metrics for each user interacting with an instance of this visual element containing a digital advertisement based on corresponding groups of pings in the ping feed; and predict outcomes for this digital advertisement across this second population of mobile devices in (near) real-time based on these engagement metrics and the model. Therefore, the remote computer system can leverage predefined engagement metric definitions to transform a sequence of pings received from a visual element—containing advertising content and loaded onto a user's mobile device—into engagement metrics describing the user's interactions with this advertising content.

In a similar implementation in which the remote computer system enables retargeting of advertisement content to a user while the user navigates within the same webpage, the remote computer system can: access engagement data extracted from pings received from a first visual element containing an advertisement at the top of a webpage accessed by a user at a computing device; leverage the engagement data extracted from these pings to predict the user's engagement with other advertisements in the same advertising campaign and/or in other advertising campaigns; and serve the user a second visual element containing a next advertisement at the bottom of the webpage, before the user scrolls to the bottom of the webpage.

2.3 Post-Hoc Engagement Metric Definition

Figure 3:
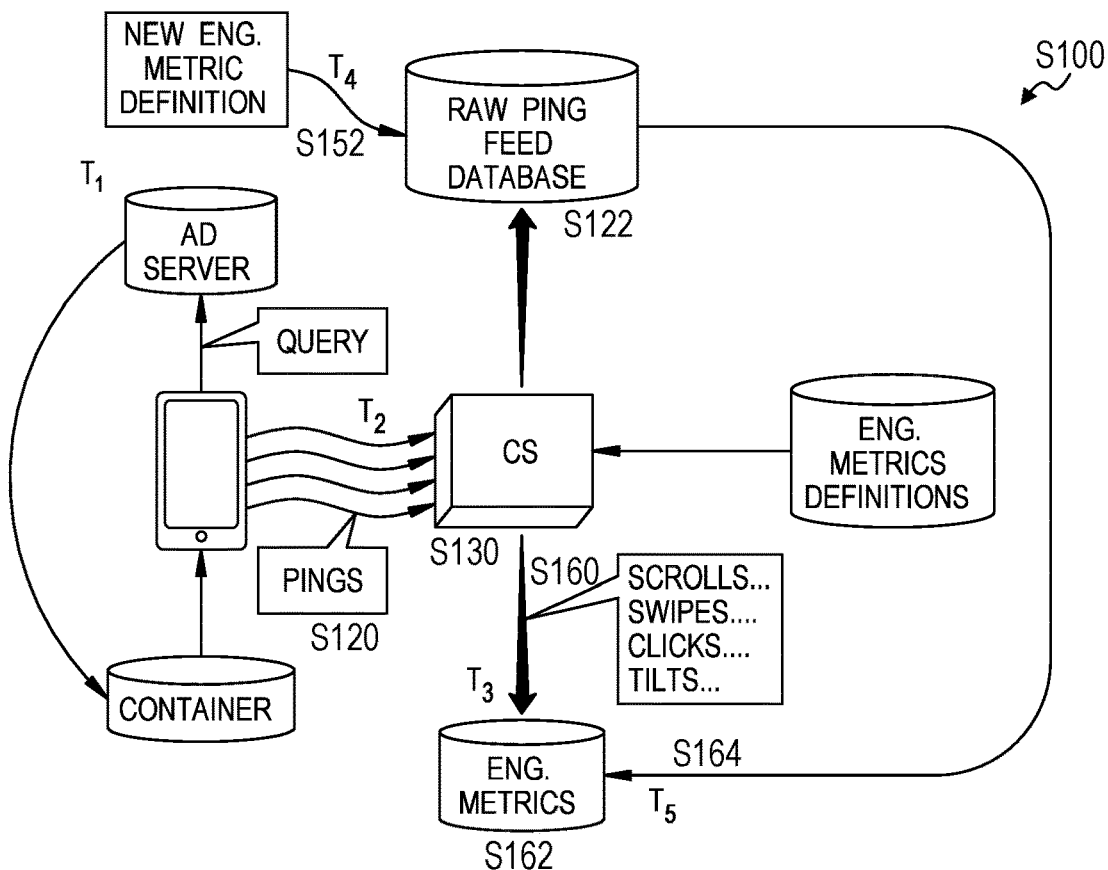
FIG. 3 is a flowchart representation of one variation of the method.
Figure 4:
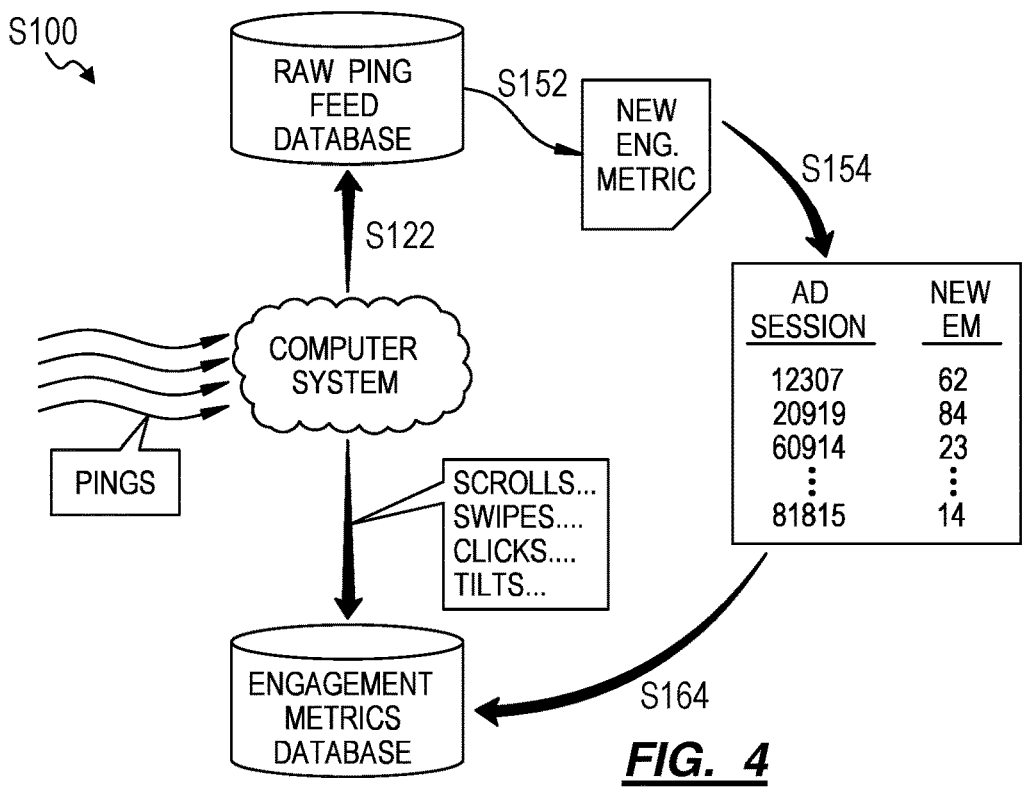
FIG. 4 is a flowchart representation of one variation of the method.

In one implementation shown in FIGS. 3 and 4, the remote computer system can: aggregate raw pings received from a visual element—containing a particular advertisement—during a browse session at a user's mobile device; derive engagement metrics for the browse session based on these raw pings and existing or predefined engagement metric definitions for the particular advertisement; and separately store these raw pings in a database in Block S164. When a new engagement metric definition is created (or "discovered") for the particular advertisement (or corresponding advertising campaign) at a later time, the remote computer system can: retrieve these raw pings from the database in Block S122; apply the new engagement metric definition to these raw pings to calculate a new engagement metric for this past advertisement session for the particular advertisement in Block S152; and update engagement metric data corresponding to this past advertisement session in the database to include this new engagement metric in Block S164. For example, the remote computer system can: at a first time, access a first engagement metric definition in a set of engagement metric definitions, the first engagement metric defining a brand lift metric; apply the first engagement metric definition to raw pings in a first browse session to calculate the brand lift metric for the first browse session; and, in response to detecting 4 scroll events, output the brand lift metric as 70% engagement based on the first engagement metric definition and write the brand lift metric to the first browse session packet accordingly. Then, at a later time, the computer system can: receive a new engagement metric definition defining a new brand lift metric (e.g., uploaded manually by an advertisement campaign manager after reviewing raw ping data and/or engagement metrics for advertising content in the advertisement campaign previously served to a population of users); retrieve raw pings from the first browse session from the database; apply the new engagement metric definition to these pings to calculate the new brand lift metric for the first browse session; in response to detecting two scroll events, one swipe event, and one continuous touch over a distance of at least 1-inch, output the new brand lift metric as 85% engagement based on the new engagement metric definition; and, update the first browse session packet to reflect the new engagement metric definition by replacing the initial 70% engagement with 85% engagement.

The remote computer system can thus leverage this new engagement metric to: generate or refine predictions for future interactions between the user and a different advertisement in the same or different advertising campaign to refine an estimate for brand lift for the user responsive to this past advertisement session; or to adjust compensation for a publisher for hosting the advertisement.

The method S100 is described herein as executed by a remote computer system to compile and aggregate pings received from visual elements loaded into webpages viewed on mobile devices (e.g., smartphones, tablets). However, the method S100 can be executed by any other local or distributed computer network(s) or computing device(s) and in conjunction with visual elements loaded into native applications and/or viewed on desktop or other devices (e.g., laptop or desktop computers).

3. Visual Element

Generally, the remote computer system can serve visual elements—containing advertisement content and configured to record various advertisement interaction data and to return these advertisement interaction data to the remote computer system—to user mobile devices for insertion into advertisement slots within webpages rendered within web browsers executing on these mobile devices. In one example shown in FIG. 2, a visual element can include an iframe element that contains static or dynamic (e.g., interactive) advertisement content and that is configured to be inserted into a webpage, to record various advertisement interaction data, and to return these advertisement interaction data at a rate of 5 Hz once the visual element is loaded into a webpage rendered in a web browser executing on a mobile device. In this example, the visual element can record: its position in the web browser; a number or proportion of pixels of the visual element in view in the web browser; a running time that a minimum proportion of the visual element has remained in view; a number of instances of clicks on the visual element; vertical scroll events over the webpage; quality of these scroll events; horizontal swipes over the visual element; panes in the visual element viewed or expanded; tilt events and device orientation at the mobile device while the visual element was in view in the web browser; number of instances of hotspots selected; instances or duration of video played within the visual element; video pauses and resumes within the visual element or an expanded native video player; time of day; type of content on the webpage or other webpage metadata; and/or a unique user identifier. The visual element can compile these advertisement interaction data into "pings" and output one ping to the remote computer system once per 200-millisecond interval, such as over the Internet or other computer network.

Figure 2:
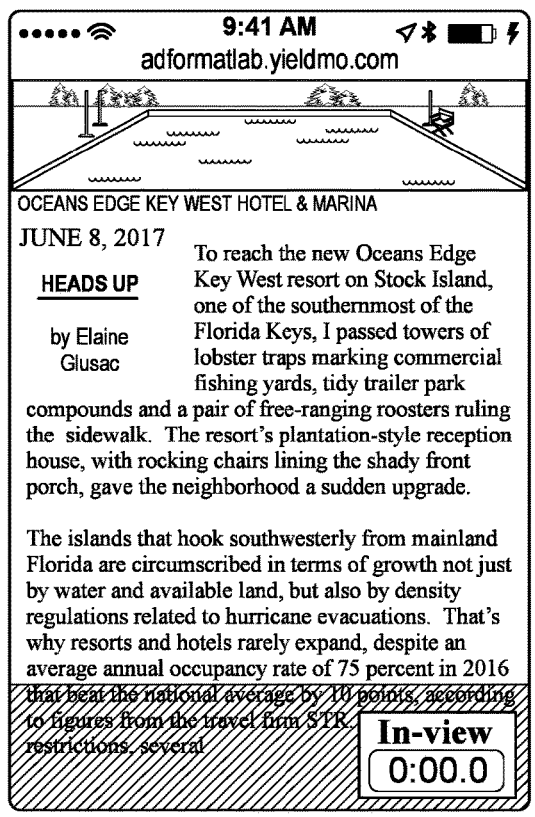
Figure 2:
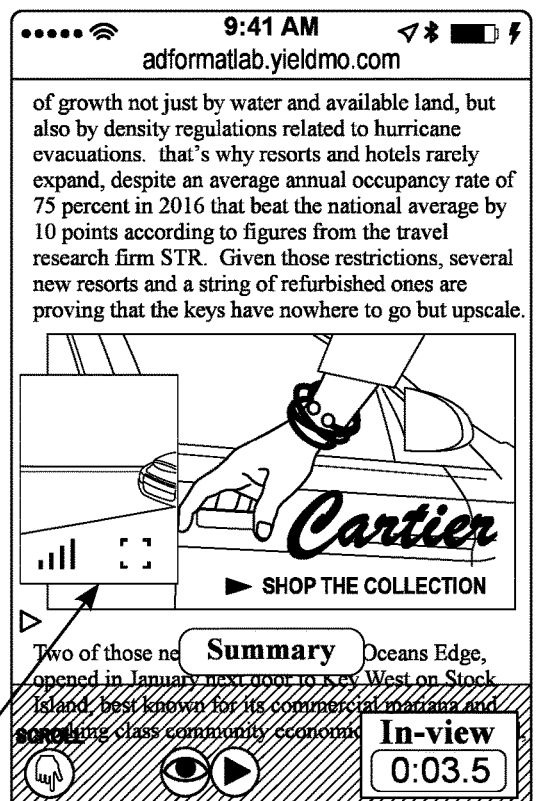
Figure 2:
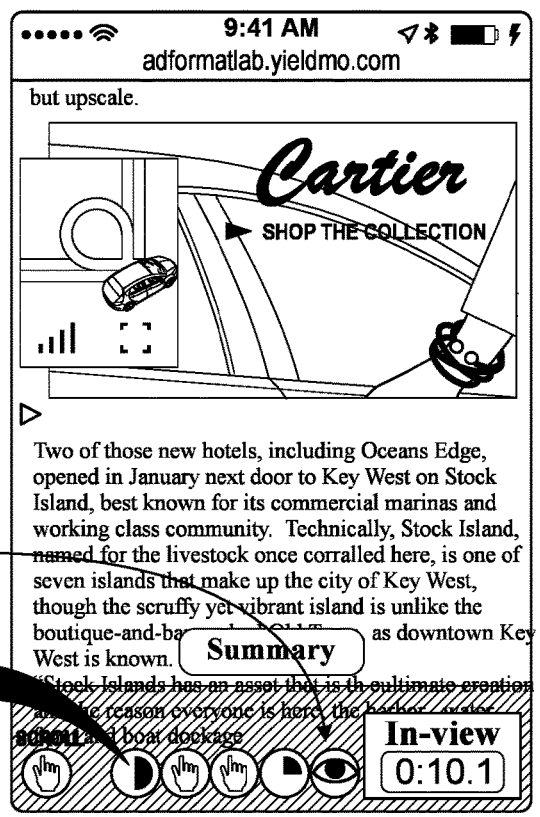

Therefore, the visual element can: contain advertisement content; can be loaded into a webpage or other electronic document; can track its location within a viewport and other interactions within the webpage or electronic document; automatically respond to these interactions, such as by starting, stopping, or seeking through a sequence of frames (e.g., in a video ad) or by indexing through a set of virtual cards; and simultaneously transmit basic interaction data in the form of "pings" to the remote computer system on a regular interval (e.g., once per 200-millisecond interval), such as shown in FIG. 2. However, the visual element can define any other file format, can be loaded with advertisement content of any other type, and can collect and return advertisement interaction data of any other type to the remote computer system in any other way and at any other interval once the visual element is loaded into a webpage rendered within a web browser on a mobile device.

4. Advertisement Serving

Figure 6:
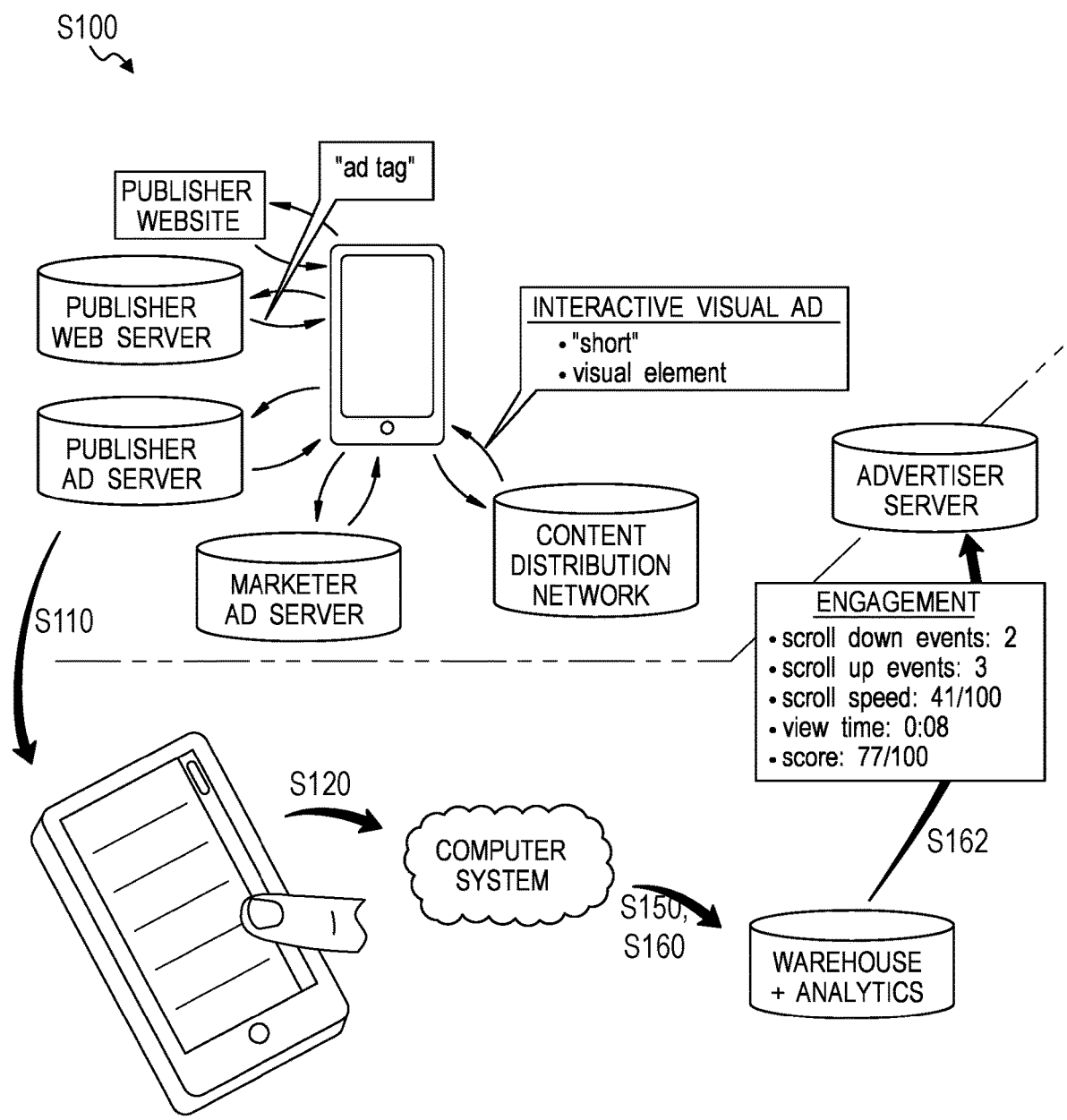
FIG. 6 is a flowchart representation of one variation of the method.

Block S110 of the method S100 recites serving a set of visual elements loaded within advertisement content to a population of mobile devices for insertion into webpages viewed on the population of mobile devices in Block S110, wherein each visual element in the set of visual elements is configured to output a sequence of pings on a regular interval, and wherein each ping contains a unique identifier of a corresponding visual element, a timestamp, and a value representing a proportion of the corresponding visual element visible in a viewport on a corresponding mobile device. Generally, in Block S110, an advertisement server can return a visual element—loaded with advertisement content and configured to broadcast pings—to a mobile device, as shown in FIGS. 2 and 6.

In one implementation, when a user navigates to a publisher's webpage via a web browser executing on her smartphone, tablet, or other mobile device, a web server hosted by the publisher can return content or pointers to content for the webpage (e.g., in Hypertext Markup Language, or "HTML", or a compiled instance of a code language native to a mobile operating system), including formatting for this content and a publisher advertisement tag that points the web browser or app to the publisher's advertisement server (e.g., a network of external cloud servers). The advertisement server can then implement an advertisement selector to select a particular asset (or ad), execute Blocks of the method S100 to transform the asset into an interactive advertisement according to a selected advertisement format as described below, and serve the interactive advertisement to the web browser or application. In one implementation, the advertisement server can return the interactive advertisement directly to the web browser or application. Alternatively, the advertisement server can return a second advertisement tag that redirects the browser or app to an advertiser or publisher advertisement server. The advertiser or publisher advertisement server can then return a third advertisement tag that redirects the web browser or app to a content delivery network, which may include a network of cloud servers storing raw creative graphics for the advertisement, and the content delivery network can return the selected interactive advertisement to the web browser.

In the foregoing implementation, the advertisement server or content delivery network, etc. can return the interactive advertisement—in the form of content within an HTML iframe element (i.e., the "visual element")—to the web browser or other mobile application. Upon receipt, the web browser can place the visual element within the webpage, the mobile application can then place the visual element within a window within the mobile application. The visual element can then animate visual content within the interactive advertisement, such as based on the position of the visual element rendered within a viewport of the mobile device or as described in U.S. patent application Ser. Nos. 15/816,853 and 15/677,259.

Furthermore, when serving the visual element to the mobile device, the advertisement server can: define a page view ID responsive to the advertisement request; and load the page view ID. The webpage can define a placement ID specifying a target location of the visual element within the webpage, and this placement ID can be stored in visual element metadata. Furthermore, an asset (e.g., advertising media) contained within the visual element can be associated with a creative ID, and this creative ID can also be stored in visual element metadata. These page view ID, placement ID, and creative ID may thus define a unique browse session for this instance of the visual element loaded onto the mobile device, and the visual element can write these metadata to each ping subsequently returned to the remote computer system, as described below.

The advertisement server can execute these methods and techniques to: serve a particular visual element to a particular mobile device for insertion into a webpage accessed at the particular mobile device; serve multiple visual elements to the particular mobile device for insertion into the same webpage; and serve a host of visual elements to many webpages accessed on many mobile devices concurrently.

5. Pings

Once loaded into the webpage at a mobile device, the visual element can generate pings representing basic advertisement interactions and output a series of pings on a regular interval (e.g., 200 milliseconds, or 5 Hz) until the webpage is closed or until a threshold duration of time (e.g., ten minutes) has passed since the visual element was loaded into the webpage.

For example, the visual element can compile: identifying metadata, including the page view ID, the placement ID, and the creative ID; a timestamp; and basic gesture information including a proportion of the visual element visible in the viewport at the mobile device (e.g., 0% to 100%) into a ping. The visual element can incorporate additional data into a ping, such as including: whether a target pixel (e.g., top-left pixel) of the visual element is in the viewport; whether a top pixel (or top row of pixels) and/or the bottom pixel (or the bottom row of pixels) in the visual element is visible in the viewport; a vertical location of the advertisement relative to the viewport; a horizontal location of the advertisement relative to the viewport; a horizontal position of the advertisement content within the visual element; an orientation of the mobile device in real space (e.g., gyroscope values output by an IMU in the mobile device); or whether the visual element has been selected (e.g., a "click-through"). The visual element can then return this ping via a cellular, Wi-Fi, local area, or other network and then repeat this process on a next interval.

In one variation, the visual element generates and outputs pings only when a minimum proportion (e.g., a single row of pixels) of the visual element is visible in the viewport at the mobile device. For example, the visual element can: generate an "in-key ping" specifying a time that the visual element came into view in the viewport; return this in-key ping to the remote computer system; and then transition into generating and returning pings to the remote computer system on a regular interval (e.g., at a rate of 5 Hz), as described above. The visual element can continue to return pings on this interval until the minimum proportion of the visual element moves out of the viewport, at which time the visual element can: generate an "out-key ping" specifying a time that the visual element moved out of view in the viewport; return this out-key ping to the remote computer system; and then cease transmission of pings to the remote computer system until (and if) the visual element comes back into view within the viewport at a later time.) Therefore, in this variation, the visual element returns pings to the remote computer system only when a proportion of the visual element is visible to a user accessing the webpage at the computing device, thus limiting the quantity of data returned to the remote computer system and thus increasing the speed at which the remote computer system can process the data and extract insights for user engagement.

In one variation, the advertisement server can load multiple visual elements—each containing unique advertisement content—onto one webpage at a mobile device; and each visual element on this webpage can independently generate and return pings to the remote computer system. Additionally, the advertisement server can load multiple visual elements—containing identical or unique advertisement content—onto multiple webpages at multiple mobile devices; each visual element on these webpages can independently generate and return pings to the remote computer system; and the remote computer system can sort these pings according to a unique identifier (e.g., browse session) and a timestamp.

6. Aggregation

In Block S120, the remote computer system: ingests raw pings output by many visual elements loaded into webpages viewed on many mobile devices concurrently; and writes these pings to a raw ping feed in near real-time (e.g., at least 200 milliseconds from generation of these pings by their corresponding mobile devices).

In one implementation shown in FIG. 1, the remote computer system stores the raw ping feed in a buffer of limited duration (e.g., a preceding ten minutes) such that the raw ping feed contains a (large) corpus of pings received from (many) mobile devices over a limited period of time up to the current time. When inserting a new ping into the raw ping feed, the remote computer system can inject the new ping into the raw ping feed in order of page view ID, placement ID, and creative ID metadata (i.e., "browse session") and then in order or timestamp. In particular, the remote computer system can group the new ping with other pings corresponding to the same browse session and sort this new ping in ascending timestamp order with other pings from this same browse session currently present in the raw ping feed. The remote computer system can repeat this process upon receipt of each subsequent ping from this or any other visual elements.

Furthermore, bandwidth limitations and lossiness of various cellular and area networks over which pings output by the mobile device are transmitted may result in receipt of pings from the mobile device out of temporal order or even lost pings. The remote computer system can therefore implement the method S100 and techniques described below for sequences of pings received from instances of the visual element over a sliding time window of limited duration (i.e., the "buffer") in order to compensate for latency in transmission of pings from visual elements and to prevent interpretation of superfluous advertisement view sessions while also enabling near real-time analysis of these advertisement interaction data (e.g., within seconds of receipt of new pings). For example, the remote computer system can: inject pings received from many visual element instances into their correct temporal positions within the ten-minute sliding window over the raw ping feed; group pings by like page view ID, placement ID, creative ID metadata and to sort pings in browse session groups by timestamp responsive to receipt of each subsequent ping; and execute methods and techniques described below to output a stream of aggregated advertisement view session data in near real-time (e.g., with a delay of approximately three seconds from generation of a last ping in an advertisement view session by a mobile device) responsive to receipt of each subsequent ping indicating a new or terminated advertisement view session across these many mobile devices.

In one variation, the remote computer system can: inject pings received from many visual element instances into their correct temporal positions within a sliding window of a set duration over the raw ping feed; group pings by browse session groups and sort pings within the browse session groups by timestamp responsive to receipt of each subsequent ping; output the raw ping feed sorted by browse session and timestamps of pings within browse sessions to a first database for storage, the raw ping feed containing all pings received from visual element instances within the sliding window of set duration; output discrete advertisement view session packets containing compressed engagement data contained in the raw ping feed to a second database. Therefore, the remote computer system can output the raw ping feed for storage, including all engagement data collected by visual elements, in a more robust database, while outputting the compressed advertisement view session packets to a separate database.

For example, the remote computer system can: receive a stream of pings from many advertisements loaded on many devices; aggregate pings from the stream of pings in a ping feed; define a sliding window over the ping feed, defining a maximum browse session duration, with a leading edge of the sliding window fixed to the current time edge of the sliding window fixed to the current time; and, in response to receiving a ping outside of the sliding window, write the ping to the raw ping database. Within the sliding window, the remote computer system can implement blocks of the method S100 to: arrange pings into ping groups by unique identifiers including: page view ID, placement ID, and creative ID; sort ping groups by timestamps contained in the pings; search ping groups for advertisement session terminuses; in response to finding an advertisement session terminus, extract engagement metrics; write engagement metrics to a metric database with a link to the particular advertisement view session (e.g., particular device and timestamp); write the raw ping data to the raw ping database; compress ping groups to advertisement sessions within the sliding window; and repeat this process for other advertisement sessions represented in the sliding window. Additionally, the remote computer system can: group advertisement sessions with same unique identifiers in the sliding window into browse sessions; derive browse session engagement metrics; write browse session engagement metrics to the metric database; in response to a trailing edge of the sliding window passing, discard the raw pings, advertisement session groups, and browse session groups from the sliding window; and repeat this process.

In another variation, the remote computer system can serve visual elements containing advertising content to user mobile devices, the visual element configured to record various advertisement interaction data including: location in a viewport of a mobile device, number of pixels of the advertisement in the viewport; duration of minimum visibility in the viewport; orientation of the mobile device; user inputs (e.g., swipe events), etc.; and package these advertisement interaction data into pings, and return these pings to the remote computer system at a set interval (e.g., every 8 kb of data, or every 2-seconds). For example, the remote computer system can serve visual elements containing advertising content to user mobile devices, the visual elements configured to: record advertisement interaction data of users interacting with mobile advertisements at mobile devices; generate pings at a regular ping interval (e.g., 200-ms intervals) containing advertisement interaction data corresponding to each ping interval; store pings in a buffer of limited duration (e.g., 5-seconds); in response to exceeding the limited duration, return the pings in the buffer to the remote computer system; and empty the buffer to repeat this process. Upon receiving the pings in the buffer from the visual element, the remote computer system can aggregate the pings into advertisement sessions and derive advertisement session metrics.

6.1 Advertisement View Session

As the remote computer system receives each subsequent ping from many mobile devices and injects the next ping into the raw ping feed in order of page view ID, placement ID, creative ID metadata, and timestamp over time, the remote computer system can isolate a contiguous sequence of pings corresponding to one browse session of a particular webpage viewed on a particular mobile device and loaded with an instance of the visual element containing a particular advertisement. The remote computer system can then: compare in-view proportions of the visual element represented in pings within this browse session in order to isolate pings representing shifts from less than a threshold proportion (e.g., one row of pixels) of the visual element rendered within the viewport on the particular mobile device to more than the threshold proportion of the visual element rendered within the viewport on the particular mobile device; and flag such pings as "in-key pings." The remote computer system can additionally or alternatively: compare in-view proportions of the visual element represented in pings within this browse session in order to isolate pings representing shifts from greater than the threshold proportion of the visual element rendered within the viewport on the particular mobile device to less than the threshold proportion of the visual element rendered within the viewport on the particular mobile device; and flag such pings as "out-key pings." (Alternatively, rather than in-key and out-key pings, the remote computer system can implement similar processes to identify key pings generally.) The remote computer system can then delete or discard all other pings indicating less than the threshold proportion of the visual element visible in the viewport on the particular mobile device during this browse session.

Therefore, the remote computer system can automatically: label key pings representing transition of the visual element into and out of viewport on the particular mobile device during this browse session; discard pings indicating that less than the threshold proportion of the visual element is visible in the viewport rendered on the particular mobile device; and thus compress many pings received from the visual element into a subset of pings representing contiguous durations of time—delineated by key pings—in which the visual element is visible in the viewport at the particular mobile device. Each such contiguous duration of time can thus represent an "advertisement view session," as described below.

In one variation, the remote computer system can conclude a first advertisement view session in a browse session and initialize a second advertisement view session within the same browse session, based on changes in the visibility of the visual element in the viewport rendered on the particular mobile device. For example, the remote computer system can: conclude a first advertisement view session containing a first group of pings at a first time in response to detecting an in-view proportion of the visual element—visible in the viewport rendered on the particular mobile device—that is less than a threshold proportion of the visual element; initiate a second advertisement view session for the visual element at a second time soon thereafter (e.g., within 200 milliseconds) if a next ping indicates that an in-view proportion of the visual element visible in the viewport during this ping interval is greater than the threshold proportion; and insert this next ping into a second group of pings—sorted by timestamps—in the second advertisement view session.

Alternatively, rather than store discrete key pings, the remote computer system can implement methods and techniques similar to those described above to inject transition flags—denoting transition of the visual element into the viewport or out of the viewport at the particular mobile device—into the raw ping feed. The remote computer system can thus delineate advertisement view sessions—containing one or more pings indicating visibility of the visual element in the viewport—between two consecutive transition flags.

Thus, in the foregoing implementations, the remote computer system can approximate and delineate between advertisement view sessions in which at least the threshold proportion of the visual element is visible in the viewport at the particular mobile device based on consecutive pings indicating that more than and then less than the threshold proportion of the visual element is visible in the viewport and vice versa, even if pings output by the visual element at the particular mobile device around the time of such a transition are lost in transit to the remote computer system. In particular, by detecting changes in visual element visibility across a series of pings corresponding to the same browse session at the particular mobile device, the remote computer system can approximate start times and stop times of discrete advertisement view sessions occurring at the particular mobile device, even if transmission of pings from the mobile device to the remote computer system during this browse session is lossy.

(Additionally or alternatively, in the variation described above in which the visual element outputs key pings directly responsive to the visual element coming into and out of view in the viewport, the remote computer system can directly delineate between advertisement view sessions based on key pings received from the visual element.)

One visual element containing advertisement content and loaded into a webpage accessed through a web browser executing on a mobile device can therefore return a sequence of pings to the remote computer system throughout a browse session at the webpage at the mobile device. Upon receipt of these pings, the remote computer system can aggregate these pings and interpret none to many advertisement view sessions, inclusive, within this single browse session, such as proportional to a number of times that a user scrolls through the webpage to bring the visual element into and out of view within the viewport at the mobile device. Other instances of the visual element containing the same or different advertisement content can be concurrently loaded onto the same webpage during the same browse session at the mobile device, onto other instances of the same webpage viewed on other mobile devices, and onto many other webpages viewed by still other mobile devices. These instances of the visual element can each return pings to the remote computer system over a concurrent duration of time, and the remote computer system can implement the foregoing methods and techniques to: group pings by like page view ID, placement ID, creative ID metadata (i.e., "browse session"); sort pings by timestamp; isolate key pings in each browse session for each of the visual element instances; and delineate none to many distinct advertisement view sessions in each browse session for each visual element instance.

6.2 Advertisement View Session ID

The remote computer system can also generate and write a unique advertisement view session ID to each ping within an advertisement view session thus identified. For example, the remote computer system can concatenate the page view ID, placement ID, creative ID metadata, and timestamp for the earliest ping in the advertisement view session to form a unique advertisement view session ID and write this unique advertisement view session ID to each ping in this advertisement view session, shown in FIG. 1.

6.3 Advertisement View Session Duration Check

In one implementation, the remote computer system can also terminate a continuous advertisement view session spanning greater than a threshold duration of time within one browse session. For example, if a total duration spanned by a group of pings representing a single current advertisement view session exceeds the threshold duration of time (e.g., ten minutes, 3000 sequential pings), the remote computer system can: close this current advertisement view session and execute methods and techniques described below to compress these pings into one output an advertisement view session packet; and then initiate a new advertisement view session containing the subsequent pings received from the same visual element while this visual element remains visible in the viewport at the same mobile device.

Therefore, the remote computer system can output the advertisement view session packet to extract engagement data before the conclusion of a browse session, enabling more frequent data analysis and at a faster rate as the data is in shorter segments.

The remote computer system can also implement other techniques to discard an advertisement view session exceeding a certain duration (e.g., 10 minutes) with minimal or no user interaction at the computing device (e.g., the user accessed a webpage on a computing device and is no longer interfacing with the computing device).

7. Advertisement View Session Analytics

The remote computer system can then extract interaction insights (or "engagement metrics") from pings contained in an advertisement view session, such as in real-time as pings are populated in this advertisement view session and/or in response to termination of the advertisement view session (e.g., when a next ping from the corresponding visual element indicates that the visual element is no longer visible in the viewport). More specifically, the remote computer system can extract engagement metrics from pings contained in an advertisement view session based on: visibility of an advertisement, an MRC, a number of scrolls over an advertisement, whether a user clicked on the advertisement, whether a user watched a certain proportion of a video advertisement, etc. The remote computer system can leverage these engagement metrics to selectively serve ads to users based on the likelihood of engagement.

In one implementation, at a later time, an advertising campaign manager may specify a new engagement metric for measuring user engagement with advertisement content in an advertising campaign. In this implementation, the remote computer system can: access the raw ping feed data stored in a separate database; apply the new engagement metric to the browse sessions within the ping feed; and update the advertisement view sessions to include the new engagement metric. For example, a campaign manager may update the visibility threshold post hoc (e.g., update visibility threshold from 50% of pixels in the advertisement in a viewport of a computing device to 70% of pixels). The remote computer system can then access the raw ping feed, previously sorted by browsing session and timestamp, and apply the new engagement metric to the raw data to calculate and therefore update the compressed visibility metric in the advertisement view session packet. Similarly, an advertising campaign manager may specify new boundaries for defining an advertisement view session within an advertising campaign. The remote computer system can access the raw ping feed, organized by browse session, and delineate one or more advertisement view sessions within each browse session based on the criteria specified by the advertising campaign (e.g., a minimum proportion of pixels of the visual element visible in a viewport of a mobile device). For example, the remote computer system can delineate advertisement view sessions for a first advertising campaign targeting advertisement visibility by a number of scroll events over the visual element. Alternatively, for a second advertising campaign targeting brand lift, the remote computer system can delineate advertisement view sessions by minimum durations that the visual element is visible in a viewport of a mobile device.

Therefore, the remote computer system can extract interaction insights in near real-time, in response to termination of the advertisement view session and/or post hoc to update interaction data contained in the advertisement view sessions and leverage these interaction insights to develop a model for predicting user engagement with different advertising campaigns and to selectively serve ads to users based on a predicted level of engagement.

7.1 Total Duration

In one implementation shown in FIG. 1, the remote computer system calculates a total duration of the advertisement view session, such as in seconds or in total quantity of pings (which can be transformed into a time in seconds based on a known duration between consecutive pings). For example, as the remote computer system receives each subsequent ping from a visual element loaded into a webpage at a particular mobile device, the remote computer system can: inject this ping into an existing advertisement view session or create a new advertisement view session based on page view ID, placement ID, and creative ID metadata in this ping; discard this ping as outside of an advertisement session, verify placement of this ping inside an existing advertisement view session, or create a new advertisement view session based on visible proportions of the visual element indicated by the ping and by a nearby (e.g., preceding) ping in the same browse session; and update a count of total duration of this advertisement view session and/or a count of pings contained in this advertisement view session accordingly.

7.2 Pixel-Time Spent

In another implementation in which each ping indicates a proportion of the visual element visible in the viewport at the mobile device, the remote computer system: calculates a time offset between each consecutive ping in the advertisement view session; multiplies the visible proportion of the visual element indicated in a ping by the time offset from the ping to the preceding (or succeeding) ping for each ping in the advertisement view session; and sums these products for pings in this advertisement view session to calculate a total "pixel-time spent" value for this advertisement view session. This total pixel-time value can thus represent a total duration of time that the visual element was viewed weighted by proportion of the advertisement visible in the viewport during this advertisement view session.

Therefore, as the remote computer system receives each subsequent ping from a visual element loaded into a webpage at a particular mobile device, the remote computer system can: inject this ping into an existing advertisement view session or create a new advertisement view session based on page view ID, placement ID, and creative ID metadata in this ping; discard this ping as outside of an advertisement session, verify placement of this ping inside an existing advertisement view session, or create a new advertisement view session based on visible proportions of the visual element indicated by the ping and by a nearby (e.g., preceding) ping in the same browse session; and update an area-weighted metric representing an amount of time that the visual element was visible in the viewport during this advertisement view session (which may correlate to user comprehension of advertisement content in the visual element during an advertisement view session) accordingly.

7.3 Fully-Viewed

In yet another implementation, the remote computer system derives a binary value representing whether the visual element came fully (i.e., 100%) into view in the viewport during at least one instance of the advertisement view session. For example, the remote computer system can set this value: to "0" by default; and to "1" if at least one ping in the advertisement view session indicates that 100% of the visual element was visible in the viewport.

Therefore, as the remote computer system receives each subsequent ping from a visual element loaded into a webpage at a particular mobile device, the remote computer system can: inject this ping into an existing advertisement view session or create a new advertisement view session based on page view ID, placement ID, and creative ID metadata in this ping; discard this ping as outside of an advertisement session, verify placement of this ping inside an existing advertisement view session, or create a new advertisement view session based on visible proportions of the visual element indicated by the ping and by a nearby (e.g., preceding) ping in the same browse session; and update a fully-viewed flag for this advertisement view session based on whether 100% of the visual element is indicated as visible in the viewport in at least one ping in this this advertisement view session accordingly.

7.4 Scroll Event

Generally, the remote computer system can delineate advertisement view sessions within a browse session, which may each represent a scroll event over which the visual element is moved into and then out of the viewport at the mobile device. The remote computer system can further distinguish whether the advertisement view session represents a scroll-down event (e.g., the viewport moving down the webpage) or a scroll-up event (e.g., the viewport moving down the webpage).

In one implementation, visual elements are configured to generate pings that indicate whether a top pixel or a bottom pixel in the visual element is visible in the viewport. Thus, if the last ping in an advertisement view session indicates that the bottom pixel of the visual element is visible in the viewport, the remote computer system can interpret this advertisement view session to represent a global scroll-down event; similarly, if the last ping in the advertisement view session indicates that the top pixel of the visual element is visible in the viewport, the remote computer system can interpret this advertisement view session to represent a global scroll-up event.

In another implementation, visual elements are configured to generate pings that include the vertical position of the visual element (e.g., the centroid of the visual element, a reference pixel of the visual element) within the viewport. Thus, for each ping in the advertisement view session, the remote computer system can: subtract the vertical position indicated in the preceding ping in the advertisement view session from the vertical position indicated in this ping; and write this position difference to the raw ping feed. The remote computer system can then count a number of changes in sign of these position differences within the advertisement view session and store this count as a number of discrete scroll events at the particular mobile device while the visual element was visible in the viewport. The remote computer system can also: segment this advertisement view session into multiple discrete scroll events delineated by changes in scroll direction; calculate position differences of the visual element within the viewport between consecutive pings; and divide these position differences by time differences between these consecutive pings (e.g., 200 milliseconds) in order to estimate scroll speed between these pings. The remote computer system can then further isolate discrete scroll events based on both: changes in scroll direction (i.e., changes in sign of position differences between consecutive pings); and increases in scroll speeds from null. The remote computer system can also calculate an average scroll speed between pings within a scroll event in this advertisement view session.

Therefore, as the remote computer system receives each subsequent ping from a visual element loaded into a webpage at a particular mobile device, the remote computer system can: inject this ping into an existing advertisement view session or create a new advertisement view session based on page view ID, placement ID, and creative ID metadata in this ping; discard this ping as outside of an advertisement session, verify placement of this ping inside an existing advertisement view session, or create a new advertisement view session based on visible proportions of the visual element indicated by the ping and by a nearby (e.g., preceding) ping in the same browse session; and update scroll-related metrics for this advertisement view session accordingly, such as including a count, direction, and/or speed of scroll events that move the visual element within the viewport during this advertisement view session.

Similarly, visual elements can be configured to generate pings containing values representing a lateral position of content within the visual element; and the remote computer system can implement methods and techniques similar to those described above to derive: discrete lateral swipe events over a visual element during an advertisement view session; and direction, speed, etc. of these lateral swipe events.

7.5 Device Orientation

In another implementation, visual elements are configured to generate pings that include angular speeds of rotation about x, y, and z axes of the mobile device onto which the visual element is loaded. Thus, as the remote computer system receives pings from a visual element, the remote computer system can implement methods and techniques similar to those described above to characterize changes in orientation of the mobile device about these axes, which may correlate to user interactions with advertisement content (e.g., virtual reality content) in the visual element that is responsive to changes in device orientation.

In a similar implementation, visual elements are configured to generate pings that include acceleration along x, y, and/or z axes of the mobile device onto which the visual element is loaded. As the remote computer system receives pings from a visual element, the remote computer system can implement methods and techniques similar to those described above to characterize accelerations of the mobile device along these axes, which may correlate to user interactions with advertisement content (e.g., virtual reality content) in the visual element that is responsive to movement of the mobile device. Therefore, the remote computer system can translate accelerations of the mobile device along one or more axes into gestures performed by the user at the mobile device and then interpret the user's engagement in advertisement content in the visual element based on these types, frequencies, and/or magnitudes of these gestures.

7.6 Touch

In yet another implementation, visual elements are configured to generate pings that include locations of touch inputs over viewports rendered on mobile devices. As the remote computer system receives a sequence of pings from a visual element, the remote computer system can implement methods and techniques similar to those described above to transform touch locations across this sequence of pings into: a duration of a continuous touch input during an advertisement view session; a contiguous path of a touch input; and/or a binary value corresponding to whether a contiguous touch input intersected the visual element at any point with an advertisement view session; etc., any of which may correlate to a user's intent to interact with advertisement content in the visual element versus other content in the webpage.

Therefore, the remote computer system can interpret a sequence of discrete touch input locations performed by a user at the mobile device into a continuous touch input pathway performed by the user. For example, the remote computer system can interpret multiple pings in the same advertisement view session containing touch input coordinates along x and y axes of the viewport of the mobile device as a horizontal swipe by the user at the mobile device.

8. Advertisement View Session Compression

The remote computer system can implement the foregoing methods and techniques in (near) real-time to update metrics for an advertisement view session as new pings for this advertisement view session are received from a visual element loaded onto a mobile device and/or once this advertisement view session closes (e.g., once the visual element visible in the viewport moves out of the viewport at the mobile device or once the duration of the current advertisement view session exceeds the threshold duration described above). Once the advertisement view session closes, the remote computer system can compile these metrics into an advertisement view session packet and return this advertisement view session packet to a database.

For example, the remote computer system can generate an advertisement view session packet—in a form similar to a raw ping—including: a unique advertisement view session ID; the page view ID, placement ID, and creative ID for the browse session; the advertisement view session start time; the advertisement view session end time; the total duration of the advertisement view session; a total count of pings in the advertisement view session; a binary value indicating whether 100% of the visual element was visible in the viewport during the advertisement view session; a number, speed, and/or direction of discrete scroll events during the advertisement view session; a number, speed, and/or direction of discrete lateral swipe events during the advertisement view session; and/or device orientation and/or orientation changes within the advertisement view session; etc. The remote computer system can then return this advertisement view session packet to a database for storage and subsequent manipulation.

Therefore, by segmenting user interactions into discrete advertisement view sessions and compressing the engagement data into engagement metrics, the remote computer system enables faster user engagement analysis and more efficient advertisement serving. For example, the remote computer system can: receive pings from a visual element containing an advertisement; compile identifying characteristics and engagement metrics contained in pings from an advertisement view session into an advertisement view session packet; output the advertisement view session packet to an external database in a short period of time (e.g., less than one minute); and thus enable selection of a next advertisement for the user (e.g., by an ad server, a content distribution network) that the user is (more) likely to engage with based on a series of advertisement view session packets generated based on pings collected by the visual element the user's mobile device.

8.1 Advertisement View Session Quality

In one variation, since a visual element is configured to output pings on a regular interval (e.g., at a rate of 5 Hz), the remote computer system can verify that the number of pings in an advertisement view session sufficiently matches the total duration of the advertisement view session. For example, the remote computer system can: multiply the total number of pings grouped in an advertisement view session to calculate a total ping duration; confirm sufficient ping density for the advertisement view session if the total ping duration falls within a threshold difference (e.g., 80%) of the total duration of the advertisement view session; and detect insufficient ping density for the advertisement view session if the total ping duration falls outside of the threshold difference of the total duration of the advertisement view session. If the remote computer system thus detects insufficient ping density for the advertisement view session—which may indicate a high proportion of lost pings during this advertisement view session—the remote computer system can: flag the advertisement view session; discard or de-prioritize this advertisement view session for incorporation into a general advertisement engagement model; discard or de-prioritize this advertisement view session when retargeting other ads to this mobile device; and/or prompt an operator to investigate network connectivity for the remote computer system.

Therefore, the remote computer system can: implement a tumbling window to aggregate a set of pings into a browse session; implement a sliding window to aggregate a subset of these pings representing a browse session into a new advertisement view session; implement a sliding window to define a new advertisement view session ID for this new advertisement view session; implement a sliding window to calculate a total time that this visual element is visible within the viewport; and implement a tumbling window to aggregate a subset of pings representing one advertisement view session into one advertisement view session packet.

9. Browse Session Compression

In one variation, the remote computer system can implement the foregoing methods and techniques in near real-time to compress pings from the raw ping feed into advertisement view session packets, each representing a discrete advertisement view session at a visual element loaded into a webpage viewed on a mobile device. The remote computer system can further compile data and metrics derived from multiple advertisement view sessions within one browse session (e.g., for all advertisement sessions or for advertisement sessions with sufficient ping density) into one browse session packet.

For example, the remote computer system can generate a browse session packet—in a form similar to an advertisement view session packet—including: the page view ID, placement ID, and creative ID for the browse session; the advertisement view session start time for the first advertisement view session in the browse session; the advertisement view session end time for the last advertisement view session in the browse session; the total duration of the browse session; a total count of pings across all advertisement view sessions in the browse session; a count of advertisement view session in which 100% of the visual element was visible in the viewport during the browse session; a number, speed, and/or direction of discrete scroll events during the browse session; a number, speed, and/or direction of discrete lateral swipe events during the browse session; and/or device orientation and/or orientation changes within the browse session; and a count of discrete advertisement view sessions within this browse session; etc. The remote computer system can then return this browse session packet to a database for storage and subsequent manipulation.

In one variation, the remote computer system can implement the foregoing methods and techniques to compile data and metrics derived from multiple advertisement view sessions within one browse session into one browse session packet. The remote computer system can further compile data from these browse session packets to generate a user engagement profile including engagement data and metrics from multiple browse sessions.

10. Modeling User Engagement

Figure 5:
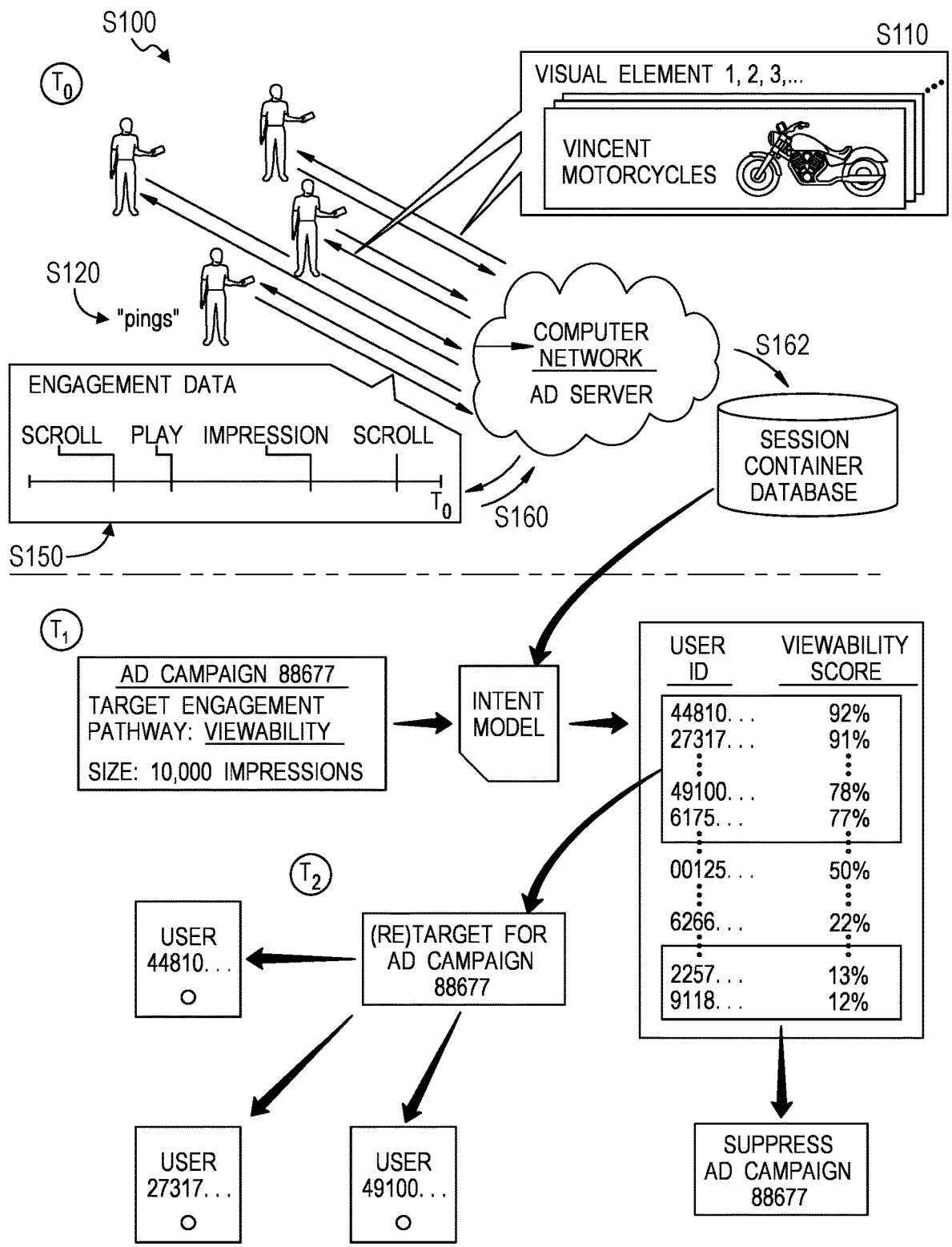
FIG. 5 is a flowchart representation of one variation of the method.

In one variation shown in FIG. 5, the remote computer system can leverage engagement data received in pings from visual elements at a population of mobile devices to generate a model for predicting user engagement with advertisement content. More specifically, the remote computer system can: serve visual elements containing advertisement content and configured to be inserted in webpages visible at a population of mobile devices over a first period of time; receive pings containing engagement data from the visual elements; sort the pings into advertisement view sessions arranged by timestamps contained in the pings and by unique identifiers representing a particular device from which a ping is received; extract engagement metrics for each advertisement view session at each mobile device in the population of mobile devices; derive correlations between engagement metrics and target outcomes specified by advertising campaigns; calculate a model based on the correlations between engagement metrics and target outcomes specified by advertising campaigns to predict user engagement with current or future advertising campaigns.

For example, the remote computer system can: at a first time, serve a set of visual elements loaded with advertisement content associated with a first advertising campaign to a first population of mobile devices for insertion into webpages viewed on the first population of mobile devices; access a first set of engagement data, representing a series of interactions between users associated with the first population of mobile devices and the set of visual elements in the first advertising campaign; train an intent model linking interactions with the set of visual elements by users at the first population of mobile devices to a target outcome specified for the first advertising campaign; at a second time, receive a query for an advertisement from a mobile device associated with a user in a second population of users; and, in response to the intent model anticipating the target outcome based on engagement data associated with the user in the second population of users, serve the first visual element in the advertising campaign to the user in the second population of users. In this example, the remote computer system can serve visual elements to one population of users over a first period of time, and leverage the engagement data contained in groups of pings representing advertisement view sessions to predict outcomes and engagement of different populations of users in the future. Therefore, an advertising campaign manager may initiate a new advertising campaign by serving advertisements within the advertising campaign to a smaller population of users. The remote computer system can then develop an engagement model for linking the compressed engagement data contained in advertisement view session packets to outcomes defined by the advertising campaign, before the advertising campaign manager expands the advertising campaign to a different or larger population of users.

In one variation, the remote computer system can leverage engagement data received in pings from visual elements to predict user interactions with current or future advertising campaigns. For example, the remote computer system can: at a first time, serve a first visual element to a user associated with a mobile device; receive pings from the visual element containing engagement data for the user recorded by the visual element during a first browse session; calculate engagement metrics from the engagement data contained in the pings; access a model linking these engagement metrics—representing measurements of user interactions with advertisement content—with target outcomes specified by current or future advertisements in advertising campaigns; predict interactions between the user and a first advertisement in a first advertising campaign based on the model and user engagement data; and, in response to predicting interactions that anticipate the target outcome specified by the first advertising campaign, serve the user the first advertisement in the first advertising campaign.

11. Advertisement View Session Creative ID

In one variation, the computer system can calculate different engagement metrics for different advertisements or different advertising campaigns, as defined by the advertisements. For example, the remote computer system can: receive a set of pings from a first visual element; identify a first advertisement associated with the set of pings based on a first creative identifier contained in the set of pings; access a set of engagement metric definitions; select a first engagement metric definition from the set of engagement metric definitions, the first engagement metric definition tagged with the first creative identifier; and apply the first engagement metric definition to engagement data contained in the set of pings; calculate the first engagement metric. The computer system can then generate a first advertisement view session packet, such as including: a unique advertisement view session ID; the page view ID, placement ID, and creative ID for the browse session; and the first engagement metric. The computer system can then: output the first advertisement view session packet to a metric database; store the set of pings containing raw engagement data in a raw ping database sorted by advertisement view session; and repeat this process for all pings from many visual elements containing the first advertisement. At a later time, when a creative (or other entity) specifies a new engagement metric tagged with the first creative identifier representing the first advertisement, the remote computer system can: access the raw ping database containing raw ping data for advertisement view sessions; identify a subset of advertisement view sessions containing the first creative identifier; apply the new engagement metric definition to the subset of advertisement view sessions; calculating the new engagement metric for this subset of advertisement view sessions; and store the new engagement metric calculated for each advertisement view session containing the first creative identifier in the corresponding advertisement view session packet in the metric database. Therefore, the computer system can calculate engagement metrics for one advertisement or one advertising campaign across all instances of the first advertisement, both in near real-time and post-hoc as new definitions are uploaded to the remote computer system.

12. Post-Hoc Engagement Metric Definitions

In one variation, the remote computer system stores raw ping data in a database. In one implementation, the remote computer system can group clusters of pings corresponding to the same browse session based on unique identifiers contained in pings and discard pings that correspond to 200-millisecond intervals in which less than the threshold proportion of the visual element is visible in the viewport of a computing device. Alternatively, the remote computer system can store all raw pings, including pings that correspond to 200-millisecond intervals in which less than the threshold proportion of the visual element is visible in the viewport of a computing device (e.g., only a top row of pixels of an advertisement is visible in the viewport). At a later time, when a creative (or other entity) creates and uploads a new engagement metric definition and submits a query for engagement metrics—for all users who saw a particular advertisement within a particular time window—the remote computer system can, according to this engagement metric: identify a set of historical browse sessions that fulfill this particular advertisement and particular time window query; retrieve groups of raw ping data for this set of browse sessions from the database; and apply this new engagement metric definition to these groups of raw ping data to generate a new set of engagement metrics for the particular advertisement accordingly. The remote computer system can then implement methods and techniques described above to generate a new model linking this new engagement metric to historical outcomes for this particular advertisement, and leverage this new model to inform redeployment of the particular advertisement or deployment of a new advertisement or advertising campaign. In one variation, the remote computer system can receive a new engagement metric definition for a particular advertisement (e.g., uploaded by a creative or other entity); identify historical browse sessions that fulfill this particular advertisement; and apply this new engagement metric definition to a subset of these browse sessions based on browse sessions in the subset of browse sessions meeting a minimum engagement threshold. For example, the remote computer system can: at a first time, output a series of browse session packets to an engagement metric database, the browse session packets containing time spent values for a first advertisement; at a later time, receive a new engagement metric definition for the first advertisement, the new engagement metric definition defining a new brand lift metric definition; access the set of browse session packets in the engagement metric database corresponding to the set of browse sessions that fulfill this particular advertisement; identify a subset of these browse session packets containing a time spent value greater than a threshold time spent value; retrieve raw ping data for the subset of browse sessions from the raw ping database; apply the new engagement metric definition to the raw ping data for this subset of browse sessions to calculate the new brand lift metric for the particular advertisement; and update the browse session packets in the engagement metric database accordingly to reflect the new brand lift metric for the particular advertisement. Therefore, the computer system can: identify a first group of users exhibiting minimal or no engagement with the particular advertisement based on time spent values contained in the advertisement session packets; identify a second group of users exhibiting at least a minimum engagement with the particular advertisement based on time spent values and brand lift metrics contained in the updated advertisement session packets; identify a third group of users exhibiting a higher level of engagement with the particular advertisement based on time spent values and the new brand lift metric; and leverage this data to inform redeployment of the particular advertisement, a new advertisement or a new advertising campaign.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for characterizing user engagement with visual elements loaded with visual content and viewed on a population of mobile devices over a period of time, the method comprising, at a remote computer system remote from the population of mobile devices:
   via a computer network, receiving a first ping from a visual element accessed by a mobile device in the population of mobile devices, the first ping containing:
      a first time value; and
      a first value representing a first amount of the visual element viewed at the mobile device at a first time corresponding to the first time value;
   in response to the first value exceeding a threshold value, grouping the first ping with a first group of pings in a ping feed, containing pings received from the population of mobile devices, each ping in the first group of pings received from the visual element prior to the first ping; and
   in response to the first value falling below the threshold value:
      deriving a first engagement metric based on the first group of pings, the first engagement metric representing user interactions with visual content rendered within the visual element;
      populating a view session packet with the first engagement metric; and
      inserting the view session packet into a browse session packet representing a browse session at the mobile device and comprising a set of view session packets representing periods of visibility of the visual element within a viewport at the mobile device.

2. The method of claim 1:
   wherein receiving the first ping containing the first value representing the amount of the visual element viewed at the mobile device at the first time comprises receiving the first ping containing a first in-view value representing the first amount of the visual element rendered within a viewport at the mobile device at the first time;
   wherein grouping the first ping with the first group of pings in response to the first value exceeding the threshold value comprises grouping the first ping with the first group of pings in response to the first in-view value exceeding a threshold in-view value; and
   wherein deriving the first engagement metric in response to the first value falling below the threshold value comprises deriving the first engagement metric in response to the first in-view value falling below the threshold in-view value.

3. The method of claim 1:
   wherein calculating the first engagement metric based on the first group of pings comprises calculating a first time spent value for visibility of visual content loaded within the visual element based on time values of pings in the first group of pings; and
   wherein populating the first view session packet with the first engagement metric comprises populating the first view session packet with the first time spent value.

4. The method of claim 3:
   wherein receiving the first ping containing the first value comprises receiving the first ping containing a first in-view value representing the first amount of the visual element rendered within a viewport at the mobile device at the first time; and
   wherein calculating the first time spent value comprises:
      for each ping, in the first group of pings:
         calculating a time offset between the ping and a contiguous ping, in the first group of pings, based on time values contained in the ping and the contiguous ping;
         calculating a product of the time offset and an in-view value contained in the ping; and
         inserting the product into a set of products derived for the first group of pings; and
      based on the set of products, calculating the first time spent value for the visual element.

5. The method of claim 1, further comprising, in response to termination of the browse session, storing the browse session packet in a first database.

6. The method of claim 5, further comprising, in response to termination of the browse session, writing the ping feed to a second database.

7. The method of claim 1:
   wherein receiving the first ping from the visual element comprises receiving the first ping from the visual element loaded with a first visual media associated with a first advertising campaign; and further comprising:

based on the first engagement metric, calculating an engagement score representing user engagement with visual content presented within the visual element at the mobile device; and in response to the engagement score falling below a threshold score, selecting a second visual media, associated with a second advertising campaign, for presentation within a second visual element at the mobile device.

8. The method of claim 1:

wherein receiving the first ping from the visual element comprises receiving the first ping from the visual element loaded with a first visual media associated with a first advertising campaign; and further comprising:

based on the first engagement metric, calculating an engagement score representing user engagement with visual content presented within the visual element at the mobile device; and in response to the engagement score exceeding a threshold score, selecting a second visual media, associated with the first advertising campaign, for presentation within a second visual element at the mobile device.

9. The method of claim 8:

wherein calculating the engagement score based on the first engagement metric comprises calculating the engagement score based on a set of engagement metrics, comprising the first engagement metric, stored in the set of view session packets in the browse session packet.

10. The method of claim 1:

wherein deriving the first engagement metric based on the first group of pings comprises deriving the first engagement metric representing user interactions with visual content rendered within the visual element during a first view session; and further comprising:

via the computer network, receiving a second ping from the visual element, the second ping containing:
a second time value; and
a second value representing a second amount of the visual element viewed at the mobile device at a second time, succeeding the first time, corresponding to the second time value; and in response to the first value falling below the threshold in-view value:
in response to the second value exceeding the threshold value, grouping the second ping with a second group of pings in the ping feed, each ping in the second group of pings received from the visual element after the first ping and prior to the second ping; and
in response to the second value falling below the threshold value:
deriving a second engagement metric based on the second group of pings, the second engagement metric representing user interactions with visual content rendered within the visual element during a second view session; and
populating a second view session packet, representing the second group of pings, with the second engagement metric.

11. The method of claim 10, further comprising:

inserting the second view session packet into the browse session packet;

deriving an engagement score based on the first engagement metric and the second engagement metric; and storing the engagement score in the browse session packet.

12. The method of claim 1, further comprising writing the ping feed to a database at a second time succeeding the first time.

13. The method of claim 12, further comprising:

accessing a second engagement metric definition defined at a third time succeeding the second time;

accessing the ping feed from the database;

based on pings in the ping feed received from the visual element, calculating a second engagement metric for the visual element according to the second engagement metric definition; and writing the second engagement metric to the first view session packet.

14. A method for characterizing user engagement with visual elements loaded with visual content and viewed on a population of mobile devices over a period of time, the method comprising, at a remote computer system remote from the population of mobile devices:

via a computer network, receiving a first ping from a visual element, accessed by a mobile device, in the population of mobile devices, the first ping containing:
a first time value; and
a first value representing a first amount of the visual element rendered within a viewport at the mobile device at a first time corresponding to the first time value;

in response to the first value exceeding a threshold value, grouping the first ping with a first group of pings in a ping feed, each ping in the first group of pings received from the visual element prior to the first ping, the ping feed containing pings received from the population of mobile devices;

via the computer network, receiving a second ping from the visual element, the second ping containing:
a second time value; and
a second value representing a second amount of the visual element rendered within the viewport at the mobile device at a second time, succeeding the first time, corresponding to the second time value; and in response to the second value falling below the threshold value:
deriving an engagement metric for a view session based on the first group of pings, the engagement metric representing user interactions with visual content rendered within the visual element during the view session;
writing the engagement metric to a view session packet;
inserting the view session packet into a browse session packet representing a browse session at the mobile device.

15. The method of claim 14, further comprising, in response to the second value falling below the threshold value:

storing the browse session packet in a first database.

16. The method of claim 14:

wherein receiving the first ping containing the first time value and the first value comprises receiving the first ping containing:

the first time value;
an identifier associated with the mobile device; and
the first value comprising a first in-view value representing the first amount of the visual element rendered within a viewport at the mobile device at the first time; and
wherein receiving the second ping containing the second time value and the second value comprises receiving the second ping containing:
the second time value;
the identifier associated with the mobile device; and
the second value comprising a second in-view value representing the second amount of the visual element rendered within the viewport at the mobile device at the second time.

17. A method for characterizing user engagement with visual elements loaded with visual content and viewed on a population of mobile devices over a period of time, the method comprising, at a remote computer system remote from the population of mobile devices:
via a computer network, receiving a first ping from a visual element accessed by a mobile device, in the population of mobile devices, the first ping containing:
a first time value;
an identifier associated with the mobile device; and
an in-view value representing a first amount of the visual element rendered within a viewport at the mobile device at a first time corresponding to the first time value;
in response to the in-view value exceeding a threshold in-view value, grouping the first ping with a first group of pings received from the visual element prior to the first ping; and
in response to the in-view value falling below the threshold in-view value:
deriving an engagement metric for a view session based on the first group of pings, the engagement metric representing user interactions with visual content rendered within the visual element during the view session;
writing the engagement metric to a view session packet; and
inserting the view session packet into a browse session packet comprising a set of view session packets representing periods of visibility of the visual element within the viewport at the mobile device.

18. The method of claim 17, wherein grouping the first ping with the first group of pings comprises grouping the first ping with the first group of pings in a ping feed containing pings received from the population of mobile devices, each ping in the first group of pings received from the visual element prior to the first ping and containing the identifier.

19. The method of claim 18, further comprising:
storing the browse session packet in a first database; and
writing the ping feed to a second database.

20. The method of claim 17, further comprising:
via the computer network, receiving a second ping from the visual element, the second ping containing:
a second time value;
the identifier associated with the mobile device; and
a second in-view value representing a second amount of the visual element rendered within a viewport at the mobile device at a second time, preceding the first time, corresponding to the second time value; and
in response to the second in-view value exceeding the threshold in-view value, grouping the second ping with the first group of pings, each ping, in the first group of pings, received from the visual element prior to the second ping and containing the identifier.

* * * * *